April 20, 1971      S. R. GILFORD      3,575,692

LIQUID SAMPLE RACK HANDLING APPARATUS

Filed Sept. 20, 1968      5 Sheets-Sheet 1

INVENTOR
Saul R. Gilford
BY Silverman & Cass
ATTORNEYS

United States Patent Office 3,575,692
Patented Apr. 20, 1971

3,575,692
LIQUID SAMPLE RACK HANDLING APPARATUS
Saul R. Gilford, Oberlin, Ohio, assignor to Gilford
Instrument Laboratories Inc., Oberlin, Ohio
Filed Sept. 20, 1968, Ser. No. 761,055
Int. Cl. G01n 1/00, 31/00
U.S. Cl. 23—253                                    6 Claims

ABSTRACT OF THE DISCLOSURE

A conveyor apparatus for handling a plurality of liquid sample containers upon which sample tests are to be performed. The apparatus has a feed elevator onto which a plurality of racks holding the sample containers are placed by a technician. The feed elevator moves the racks to a conveyor table along which the intended tests are performed. A programming device controlled by a fiber bundle sensing system automatically starts and stops the conveying and testing operations at suitable stages of operation of the apparatus. A storage elevator is provided adjacent the conveyor table to remove and store the racks which hold containers upon which testing has been completed until the same can be removed therefrom by a technician.

CROSS-REFERENCE TO RELATED APPLICATIONS

Two applications which are copending with this one and which are owned by the assignee of the applicant herein will be referred to hereinafter. One application is entitled Test Sample Identifying System and Apparatus for Use in Connection Therewith, Ser. No. 691,751, filed Dec. 19, 1967, and in which Saul R. Gilford and Robert J. Emary are the applicants. The second application is entitled Biological Fluid Sample Processing Apparatus, Ser. No. 691,783, filed Dec. 19, 1967, in the name of the applicant herein.

The first of these applications will be referred to hereinafter as the "Sample Identification" application, and the second will be referred to as the "Sample Processing" application.

SUMMARY OF THE INVENTION

This invention relates generally to liquid sample testing systems, and more particularly, to a sample rack handling apparatus for use with such systems, the apparatus being capable of handling a plurality of sample containers containing samples which are to be tested one after the other.

As discussed in the above referred to sample identification and sample processing applications, an important aspect of the diagnosis and treatment of disease as well as in the prevention thereof is the clinical testing process conducted routinely in hospitals and laboratories. Such tests are performed on large numbers of blood and other body fluid samples which are taken from a patient and must be processed to obtain usable data therefrom. This invention is concerned with an apparatus which enables the speedy and efficient handling and testing of a plurality of such samples.

The large number of samples which must be processed daily in most laboratories has prompted the recent use of so-called automatic chemistry devices which perform a plurality of tests on a plurality of samples on a more or less production line basis. The problems represented by such systems such as the identification of samples and the method of performing such tests have for the most part been resolved by the sample processing and sample identification applications referred to above. However, the us eof such systems has prompted the need for an apparatus capable of handling and storing the containers which are to be used in carrying out such tests.

The sample processing application describes a container particularly suited for use with the instant invention. Such container may carry identification of the source, test and test results to be performed on the contents thereof. Additionally, the said container may be indexed in mounted condition on a carrier or rack so that a plurality of sample containers may be handled together. The testing structure may include a reading apparatus responsive to the information carried on the identification card of the container.

The herein invention provides an apparatus most particularly suited for use with the container and testing system described in the said related applications. Since the invention herein was developed primarily for use in handling biological fluids in containers of the said related applications, the description which follows will be particularly directed to such fluids and containers, but it is to be kept in mind that this is only by way of example, and is not to be considered to limit the invention.

A technician using the apparatus of the invention will gather a plurality of sample containers holding the samples to be tested. These containers will be placed upon suitably constructed carrying racks. The racks in turn will be loaded upon a feed magazine capable of retaining a plurality of racks until each rack can be reached for testing. Thereafter, the sample testing procedure is completely automatic requiring no further manual handling of the sample containers by the technician. The entire operation continues unattended and stops automatically upon completion of the testing of the samples which have been loaded upon the apparatus.

The principal advantage and object of the invention is to achieve a degree of automation in the testing of biological and other fluids through the use of an apparatus which is capable of independently handling a plurality of containers in which the samples to be tested are stored. The apparatus will carry out all steps required of such testing and store the said containers until removal thereof from the apparatus. As a result of the invention, high speed and efficient handling of samples results, along with many other incidental benefits including the freeing a technician for other duties.

Many other objects and advantages will become apparent from the discussion and description which follows.

DESCRIPTION OF THE PREFERRED EMBODIMENTS

Figure 1:
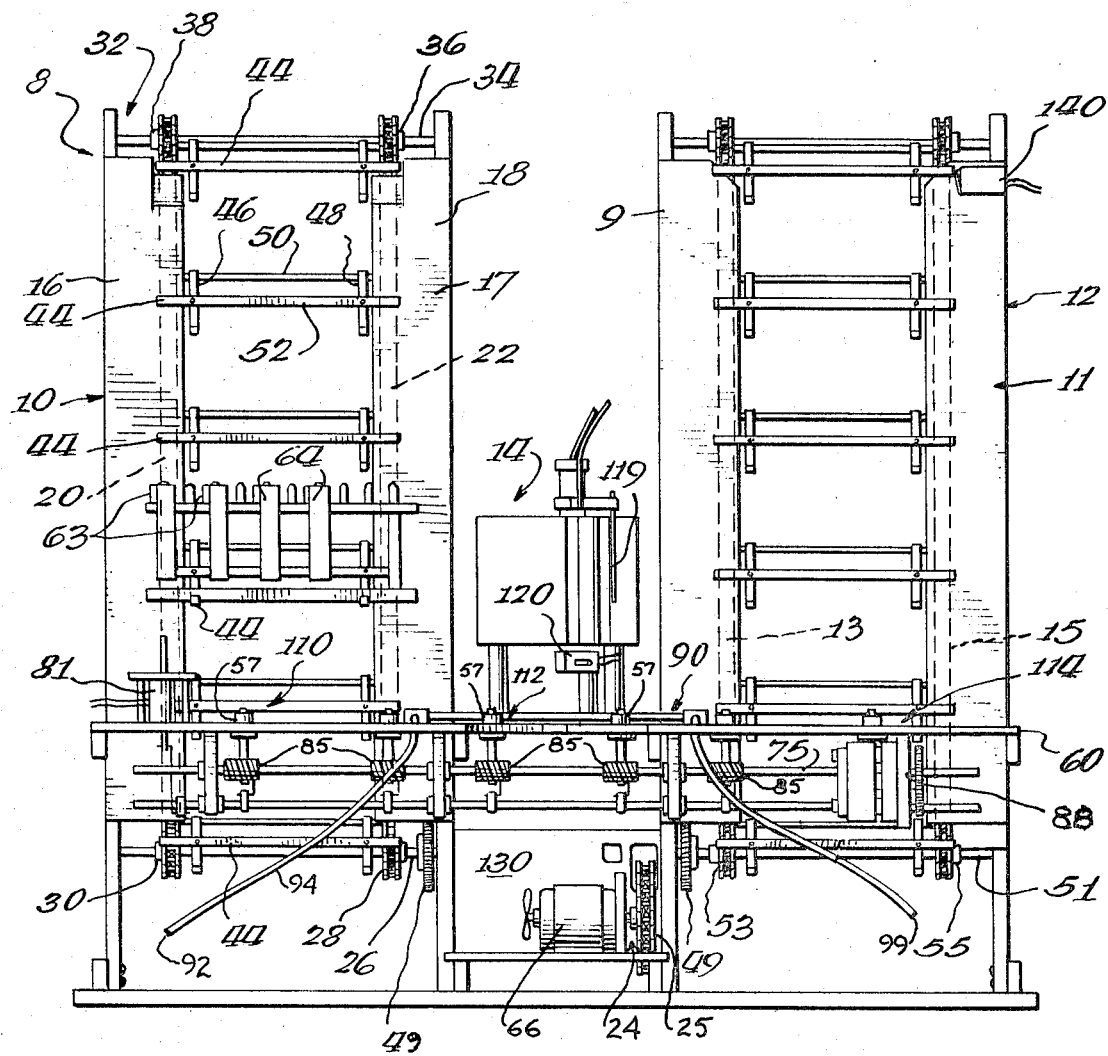
FIG. 1 is a front elevational view of a sample rack handling apparatus constructed in accordance with the invention.

The apparatus 8 illustrated in FIG. 1 is capable of handling a plurality of racks which have sample retaining containers positioned thereon, which samples are to be tested in a manner to be defined hereafter. Two elevators 10 and 12 are shown on the left and right ends respectively of the apparatus 8. A testing machine, designated generally as 14, is mounted to the apparatus 8 intermediate the two elevators 10, 12. Each elevator 10, 12 is constructed substantially the same as the other and therefore only one need be described in detail.

Looking at the elevator 10 on the left side of the apparatus 8, a pair of vertical standards 16, 18 define the said elevator 10. Each vertical standard 16, 18 is of substantially L-shaped configuration with one leg 17 and another leg 19 normal to the said leg 17. Positioned within the said standards 16, 18 and hidden from the front view of the apparatus 8 are a pair of endless sprocket chains 20 and 22. The endless sprocket chains 20, 22 are driven by drive means 24 positioned below the apparatus 8 in a manner to be described.

Figure 6:
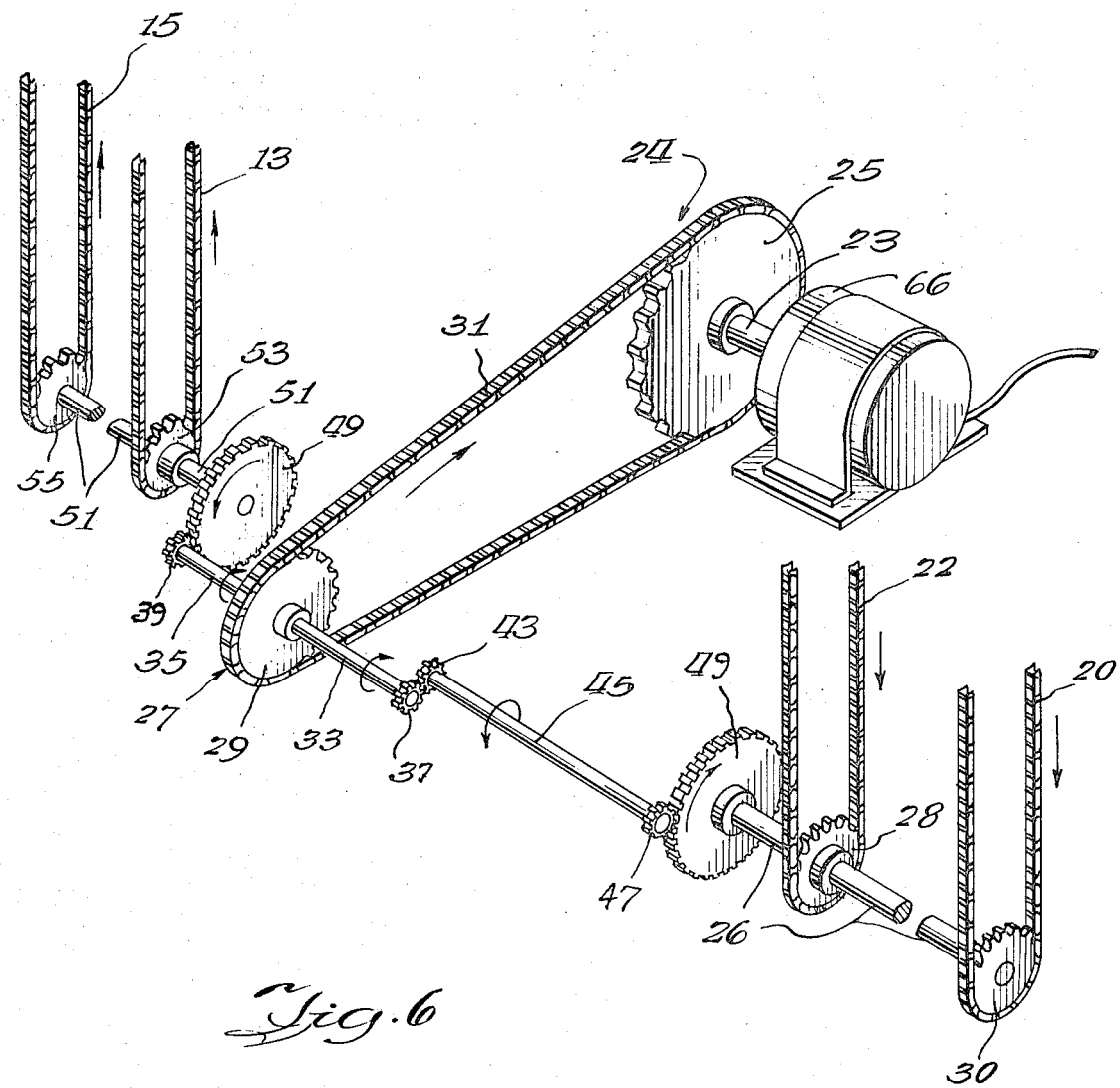
FIG. 6 is a diagrammatic perspective view of the gear and train mechanism of the apparatus illustrated in FIG. 1.
Figure 7:
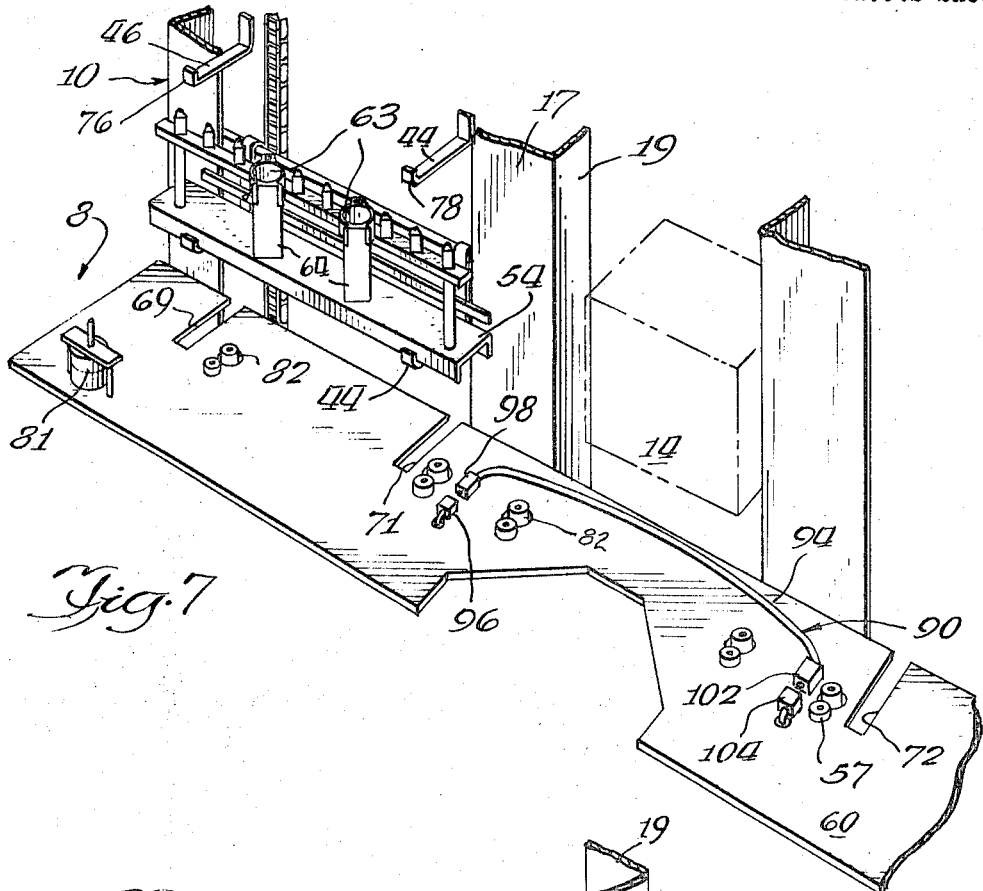
FIG. 7 is a fragmentary perspective view of a portion of the apparatus illustrated in FIG. 1.

Looking at FIGS. 1 and 6, drive means 24 include a driving motor 66 powered by a suitable source (not shown). An axle 23 connects the motor 66 to a drive wheel 25. The power from motor 66 is transmitted to gear train 27 by endless sprocket chain 31 which joins drive wheel 25 to following wheel 29. Two axles 33, 35 extend in opposite directions from following wheel 29 and terminate with gears 37, 39 respectively. Looking at the right-hand portion of gear train 27 in FIG. 6, which corresponds to the left-hand portion of the apparatus 8 of FIG. 1, a stepdown gear 49 follows gear 39 and rotates in counterclockwise fashion. The motion of gear 49 is transmitted to sprocket gears 53, 55 by axle 51. The gears 53, 55 transmit motion to endless sprocket chains 13, 15 causing counter-clockwise motion to be transmitted thereto when motor 66 is energized.

Looking now at the right-hand portion of FIG. 6, corresponding to the left hand portion of the apparatus 8 illustrated in FIG. 1, rotational movement of gear 37 is transmitted to gear 43. Rod 45 transmits this motion to gear 47 which transmits the motion to step-down gear 49. Axle 26 transmits the clockwise motion of gear 49 to the sprocket gears 53, 55 respectively which control the endless sprocket chains 20, 22 of the left-hand elevator 12. It will thus be seen that motor 66 will transmit concurrently through a suitable gear train arrangement 27, counterclockwise motion to the sprocket chains of left hand elevator 10 and clockwise motion to the sprocket chains of right hand elevator 12. Mounted at the top of standards 16, 18 is a second axle and gear arrangement 32 consisting of an axle 34 and gears 36, 38. The endless sprocket chains 20, 22 are wound respectively about gears 30 and 38, and gears 28 and 36. A similar arrangement is provided at the top of standards 9, 11 of right hand elevator 12.

Figure 3:
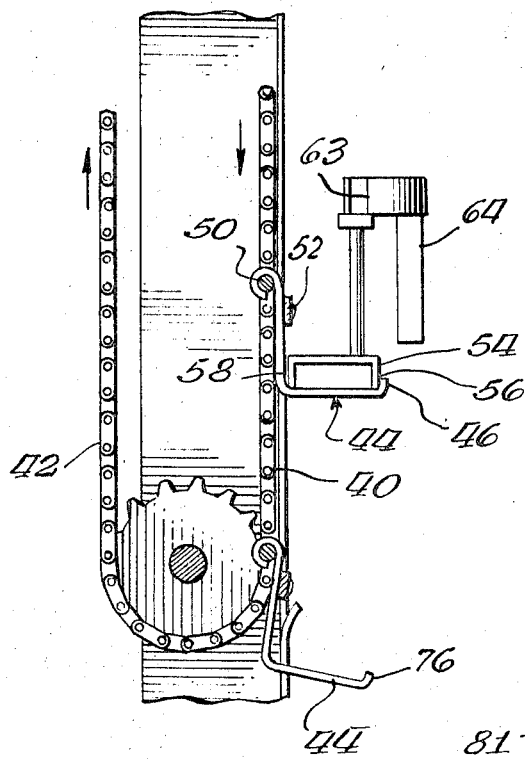
FIG. 3 is a side elevational view of a portion of a feed magazine constructed in accordance with the invention.

The left elevator system 10 may be referred to as a feed magazine for the apparatus illustrated in FIG. 1. The feed magazine 10 has a front reach 40 and a rear reach 42 (FIG. 3). Mounted upon the endless sprocket chains 20, 22 at conveniently spaced locations are a plurality of rack carriers 44, there being shown in FIG. 1 four of these rack carriers for purposes of illustration only. It will be understood that more rack carriers could be mounted upon the feed magazine 10 if desired. Each rack carrier 44 has a pair of arms 46, 48 which extend forwardly thereof. The arms 46, 48 are wrapped about a rod 50 which extends between the endless sprocket chains 20, 22. The rod 50 is secured at a convenient location between the chains 20, 22. A bracing member 52 is mounted to the carrier 44 to facilitate movement of the carrier 44 along the front faces of legs 17 of the vertical standards 16, 18.

Each carrier 44 is swingably mounted to rod 50. As the endless sprocket chains 20, 22 move, with the front reach 40 of the elevator 10 moving down and the rear reach 42 thereof moving up, each carrier 44 is flopped over the top axle 34 to assume an aligned condition as illustrated in FIG. 1. When such an unloaded carrier reaches the bottom of the feed magazine 10 the carrier 44 is flopped down and rides up the back reach 42 until it is again flopped over to a proper position where it makes the top turn of the elevator 10.

Each of the carriers 44 is adapted to hold a sample container carrying rack 54 which has sample holding containers 63 placed thereupon. The racks 54 are of substantially channel-shaped configuration with a front foot 56 and a back foot 58. These feet slide along a table 60 in a manner which will be described below. The containers 63 positioned on racks 54 may be of any suitable configuration but are illustrated as disclosed in the above referred to sample processing application. A sample identification data card 64 hangs from the front of the sample containers 63 for a purpose to be described.

Figure 2:
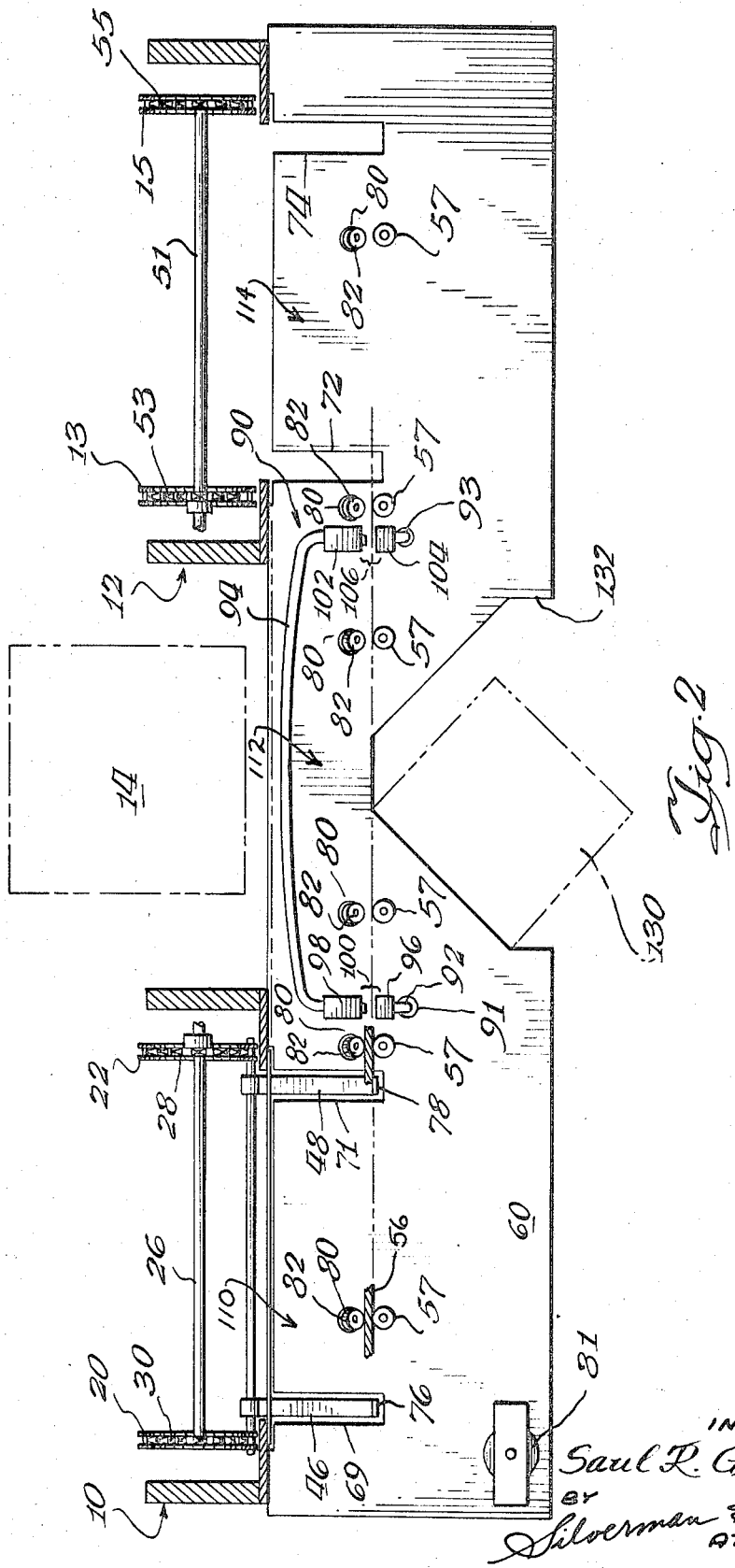
FIG. 2 is a top plan view of the table portion of the sample rack handling apparatus illustrated in FIG. 1.

Looking now at FIG. 2, table 60 lies in a plane normal to feed and storage magazines 10, 12, which bridge the same. Table 60 is provided with a pair of slots 69 and 71 aligned with the path of the arms 46, 48 of the carrier 44. The slots 69, 71 permit passage therethrough of arms 46, 48 of carrier 44 when the latter is unloaded and does not have a sample rack 54 positioned thereupon. A similar pair of slots 72, 74 are positioned in the table 60 adjacent the storage magazine 12 for a like purpose as that described in connection with the feed magazine 10. The end of each leg 46, 48 of carrier 44 has a bent up portion or lip 76, 78, respectively to prevent a sample rack loaded thereupon from sliding off the carrier.

In line with the free end of the two arms 46, 48 of carrier 44, adjacent lips 76, 78, are six apertures 80 positioned in the table and passing completely therethrough. The apertures 80 are large enough to permit passage of metal pinch rollers 82 therethrough. The metal pinch rollers 82 extend below the table 60 and are connected to a pivotal rod 68 which is operated in a manner to be described. Adjacent each metal pinch roller 82 is a rubber drive roller 57 spaced a small distance from the said rollers 82. Drive rollers 57 are connected by a gear arrangement to a rotation rod 75 which is driven by motor 88. Pinch rollers 82 are movable toward and away from drive rollers 57 such that, when desired, the said rollers 82 can be moved into close contact with rollers 57.

Adjacent the testing machine apparatus 14 on table 60 is a photo-electric fiber bundle sensing device 90. The sensing device 90 consists of a photocell (not shown) positioned below the table 60 adjacent the terminus 92 of the fiber bundle 94. Fiber bundle 94 is of a construction well known in the art and consists of a multiplicity of plastic fibers along which light is transmitted even through tortuous paths. The fiber bundle 94 extends through a suitable aperture 91 in table 60 to a mounting block 96. Opposite the block 96 and directly in line therewith is a second mounting block 98 separated from block 96 by a small gap 100. The fiber bundle 94 extends along table 60 to a third mounting block 102 across from which is a fourth mounting block 104 directly in line with block 102. A small gap 106 separates the two mounting blocks 102 and 104. The fiber bundle 94 continues below table 60 through aperture 93 and terminates at 99 adjacent a light source (not shown). It will be seen that the two gaps 100 and 106 are in line with the space between rollers 82, 57 and are in series along the length of the fiber bundle 94 of sensing device 90. If there is no obstruction in either of the gaps 100, 106, illumination from the light source will shine across the two gaps 100, 106 and through the fiber bundle 94, striking the phototube at the end 92 of the fiber bundle and energizing same. If either one of the gaps 100, 106 is blocked, the phototube will become deenergized. Since the gaps are in series, if either gap is blocked the energizing of the circuit by the phototube will be cut off.

In operation, a technician will gather the racks 54 which have been loaded with sample holding containers 63 by a technician and place the racks on the left hand elevator 10 in each of the carriers 44, filling the elevator 10, so that it is not necessary to wait until the tests to be performed are done on each container. The apparatus 8 operates in a manner such that the left hand elevator 10 brings the carriers 44 down to the table 60. If there is no rack on a given carrier, the arms 46, 48 of the carrier pass through the slots 69, 71 in the table 60 and the elevator 10 continues to run. The racks 54, each having a front foot 56 and a rear foot 58, will slide along the surface of the table with little frictional obstruction. When a carrier 44 brings a rack 54 into contact with the table 60 at deposit station 110, the front foot 56 of the rack will be disposed in the gap 100 of the fiber bundle 94. The foot 56 will thus obstruct light to the photocell through fiber bundle 94 and deenergize the elevator 10 so that no further carriers move down toward the table 60. Simultaneously with the deenergization of the elevator 10 a gear and spring arrangement will be energized to move the pinch roller 82 into contact with the front foot 56 abutting the drive roller 57.

Figure 4:
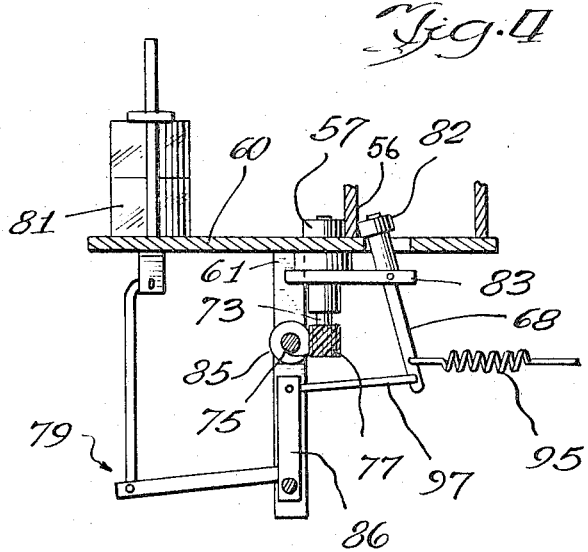
FIG. 4 is a fragmentary vertical sectional view of a portion of the conveyor system taken generally along the line 4—4 of FIG. 5 and in the indicated direction.
Figure 5:
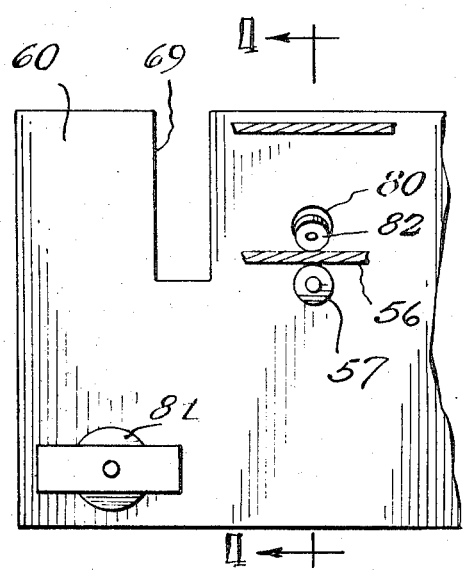
FIG. 5 is a fragmentary top plan view of a portion of the table illustrated in FIG. 2 showing the detail of one end thereof.

FIG. 4 illustrates the detailed operation of pinch roller 82 and drive roller 57. Rubber drive roller 57 is connected by a shaft 73 to a following gear 77. Drive gear 85 is hingedly mounted to the underside of table 60 on a bracket 61. Motion is imparted to drive gear 85 through shaft 75 which runs the length of table 60 and mounts each gear 85. The motor 88 provides the rotational movement to shaft 75. An extending bracket 86 depends from shaft 75 and is pivotally connected to control linkage 79 which is operated by air cylinder 81 mounted above table 60. Metal pinch roller 82 is pivotally mounted to bracket 83 below table 60. Roller 82 rotates about shaft 68 which is retained in the position shown by spring 95 mounted to the apparatus chassis so that roller 82 is retained in a position adjacent drive roller 57. Linkage 97 connects shaft 68 to bracket 86. When air cylinder 81 is in relaxed position, drive gear 85 mates with following gear 77 to rotate roller 57. Simultaneously, roller 82 abuts roller 57 in closely spaced relationship. When air cylinder 81 is activated, linkage 79 moves drive gear 85 away from follower 77 to stop rotation of roller 57. Simultaneously with this operation, linkage 97 pivots axle 68 such that roller 82 moves away from contact with roller 57.

Figure 8:
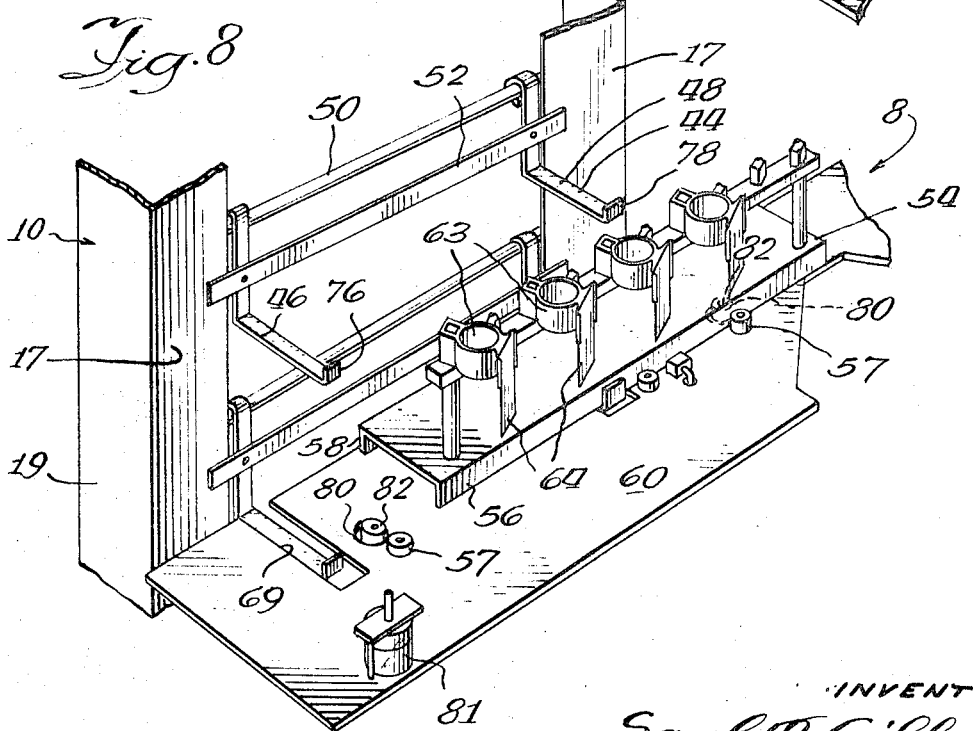
FIG. 8 is a view similar to that of FIG. 7 but showing closer detail of the conveying system of the apparatus constructed in accordance with the invention.

When rack 54 is deposited on table 60 by feed elevator 10, foot 56 of carrier 44 blocks the light to the photocell, thus energizing air cylinder 81 and motors 66, 88. Pinch roller 82 moves toward drive roller 57 grabbing the front foot of the rack 54 and moving it to the right. As the rack 54 moves along the table 60, it approaches a sensing device such as a photocell 120. Photocell 120 is associated with testing device 14 which performs the desired tests on the contents of the containers adjacent testing station 112. The tests to be performed are those known in the art, such as those set out and described in the aforementioned sample processing application. In the case of the liquid sample containers on the racks illustrated in FIG. 8 the back of the sample container 63 has a shiny surface that is used to reflect light from a lamp to a photocell. Another arrangement of sample holder could be that as described in the above referred sample identification application in which an identifying card such as card 64 is used. When a sample container is detected by the sensing device 120, the pinch rollers 82 will separate from drive rollers 57, thus stopping the rack 44 adjacent testing apparatus 14. The testing machine 14 will then be put into operation and a snorkle tube 119 to be dipped into the sample.

After the test is completed, a printing machine 130, which is positioned below the triangular cutout portion 132 of table 60, prints the results of the test on a tag carried by each sample holder. The pinch rollers 82 are again engaged against the foot 56 of rack 54 to move the said rack further along the table 60. As soon as the rack 54 clears the right hand gap 106 it will be positioned above the slots 72, 74 adjacent the storage magazine 12 at pickup station 114. At this time the endless sprocket chains 13, 15 of the storage magazine 12 will be energized and the front reach of the storage elevator 12 moves upwardly. The carrier on the storage elevator comes up through slots 72, 74 in table 60 and catches the rack which is disposed on the table across the slots. The operation continues until a number of racks accumulate on the righthand elevator 12 which continues to raise each rack 54 higher and higher. The storage magazine 12 stores the racks 54 having tested samples thereon until a technician has the opportunity to remove them. Alternatively, the storage magazine could cooperate with another lateral conveyor (not shown) system adapted to carry the racks away to another station. At the top of the storage magazine 12 is a limit switch 140 which cuts off the power to the machine as soon as a rack has reached the top of the storage magazine 12. A technician would have to remove this top rack in order to permit the apparatus 8 to recommence operation.

It is believed that the invention and its various embodiments has been sufficiently described to enable the skilled artisan to understand and practice same. The invention has been distinctly pointed out in the appended claims intended to be broadly and liberally construed.

What it is desired to be secured by Letters Patent of the United States is:

1. Apparatus for handling sample racks, each rack having a plurality of sample containers mounted thereon and each container having indicia identifying a test operation to be performed with a sample carried in said container, said apparatus comprising:
    (A) a pair of vertically arranged rack conveyors spaced laterally from one another,
    (B) a horizontal conveying track extending between a deposit station adjacent one conveyor and a pick-up station adjacent the second conveyor, said stations being aligned on said track,
    (C) conveyor drive means energizable to drive said conveyors in synchronism with one another but in opposite vertical movements,
        (1) said one conveyor having a reach moving downward and provided with spaced rack supports whereby to bring any racks carried by said supports downward toward said deposit station for depositing said racks at said station, and
        (2) said second conveyor having a reach moving upward and also provided with spaced rack carriers whereby to pick up and raise racks disposed at said pickup station,
    (D) means at the deposit station for removing any rack from said one conveyor,
    (E) rack translating means energizable for translating any rack along said track from said deposit to said pick up station,
    (F) means rendering said conveyor drive means inoperative when a rack is disposed anywhere on said track short of said pick-up station and acting initially to energize said rack translating means when a rack is deposited at said deposit station,
    (G) a test station including apparatus for performing a test operation between said deposit and pick-up stations adjacent said track and including means responsive to said indicia for performing said test when a container is disposed at said test station, and
    (H) control means for programming the operation of said apparatus sequentially to perform a test on the samples in a plurality of containers.

2. The apparatus as claimed in claim 1 in which said second conveyor has a capacity of a predetermined number of racks, and means are provided for de-energizing said drive means of both conveyors when the capacity of said second conveyor has been filled.

3. The apparatus as claimed in claim 1 in which said horizontal conveying track includes a table arranged on a fixed plane relative to said apparatus and immediately adjacent both of said conveyors, said deposit station being that portion of the table immediately in front of said reach of said one conveyor, said pick-up station being that portion of the table immediately in front of the reach of said second conveyor, and the test station being a portion of the table between said other two stations and immediately in front of said test apparatus.

4. The apparatus as claimed in claim 3 in which each rack carrier and rack support has extensions thereon extending outwardly from said reaches, each of said deposit and pick-up stations being provided with recesses clearing said extensions to permit operation of said conveyors without interference with said table, there being a portion of said table between the recesses at said deposit station which comprises said means for removing a rack from said one conveyor.

5. The apparatus as claimed in claim 3 in which said rack translating means comprises pairs of pinch rolls at least one of each pair is driven and at least one of each pair is movable relative to the other so that the pairs each may nip objects therebetween, and in which each rack is provided with a foot portion aligned with the pairs of pinch rolls, and the conveyors include structure to drive the driven rolls and move the ones of said pair together in accordance with operation of said programming means.

6. The apparatus as claimed in claim 4 in which each rack has a foot portion bridging said recesses so that although capable of being carried upon a pair of extensions, as said extensions move through the table recesses from top to bottom, any rack on said extensions will be deposited on said table, and as said extensions move through the table recesses from bottom to top, any rack disposed on the table and bridging the recesses will be picked up on said extensions.

References Cited
UNITED STATES PATENTS

| | | | |
|---|---|---|---|
| 3,302,615 | 2/1967 | Tietje | 23—259X |
| 3,327,535 | 6/1967 | Sequeira | 23—259X |
| 3,349,815 | 10/1967 | De Baets | 23—259X |
| 3,481,709 | 12/1969 | Slone | 23—253 |
| 3,489,521 | 1/1970 | Buckle et al. | 23—259X |

MORRIS O. WOLK, Primary Examiner

R. E. SERWIN, Assistant Examiner

U.S. Cl. X.R.

23—259